(12) United States Patent
Akiyama et al.

(10) Patent No.: US 8,522,654 B2
(45) Date of Patent: Sep. 3, 2013

(54) CUTTING-EDGE POSITION DETECTING METHOD AND CUTTING-EDGE POSITION DETECTING APPARATUS

(75) Inventors: Takanobu Akiyama, Numazu (JP); Hiroyuki Kakishima, Takata-gun (JP)

(73) Assignee: Toshiba Kikai Kabushiki Kaisha, Tokyo-to (JP)

( * ) Notice: Subject to any disclaimer, the term of this patent is extended or adjusted under 35 U.S.C. 154(b) by 827 days.

(21) Appl. No.: 12/749,540

(22) Filed: Mar. 30, 2010

(65) Prior Publication Data
US 2010/0242693 A1 Sep. 30, 2010

(30) Foreign Application Priority Data
Mar. 31, 2009 (JP) ................. 2009-087000

(51) Int. Cl.
*B23B 1/00* (2006.01)
*B23B 25/00* (2006.01)
(52) U.S. Cl.
USPC ............. 82/1.11; 82/47; 82/118; 700/59
(58) Field of Classification Search
USPC ........ 82/118, 152, 1.11, 47; 409/66; 408/16; 700/59
See application file for complete search history.

(56) References Cited

U.S. PATENT DOCUMENTS

| | | | |
|---|---|---|---|
| 3,560,096 A * | 2/1971 | Watson et al. | 356/430 |
| 5,392,502 A * | 2/1995 | Freer | 29/52 |
| 6,175,778 B1 * | 1/2001 | Xu et al. | 700/203 |
| 8,393,836 B2 * | 3/2013 | Wang | 409/235 |
| 2002/0033082 A1 * | 3/2002 | Nakaminami et al. | 82/117 |
| 2003/0160193 A1 * | 8/2003 | Sanchez Revuelta et al. | 250/559.19 |

FOREIGN PATENT DOCUMENTS

| | | |
|---|---|---|
| JP | 08-257876 | 10/1996 |
| JP | 2004-358624 | 12/2004 |
| JP | 2006-142412 | 6/2006 |
| JP | 2006-284531 | 10/2006 |

OTHER PUBLICATIONS

English language abstract of JP-2004-358624.
English language abstract of JP-2006-284531.

(Continued)

*Primary Examiner* — Will Fridie, Jr.
(74) *Attorney, Agent, or Firm* — DLA Piper LLP (US)

(57) ABSTRACT

The cutting-edge position detecting method includes the steps of: under a condition in which the cutting edge of the tool is positioned in an image that is taken by a camera, performing first sampling scanning operations for the image in a predetermined scanning direction at predetermined first intervals, and recognizing points on an upper edge line of the cutting edge of the tool and points on a lower edge line thereof, based on brightness changing points upon the first scanning operations; connecting the recognized points on the respective two edge lines, so as to obtain two first-level approximate linear lines by a least-squares method; performing second sampling scanning operations for the respective two first-level approximate linear lines in directions perpendicular thereto at predetermined second intervals, and newly recognizing points on the upper edge line of the cutting edge of the tool and points on the lower edge line thereof, based on brightness changing points upon the second scanning operations; connecting the newly recognized points on the respective two edge lines, so as to obtain two second-level approximate linear lines by a least-squares method; and obtaining a coordinate of an intersection of the second-level approximate linear lines, as the position of the cutting edge of the tool, with respect to the measurement reference point.

6 Claims, 9 Drawing Sheets

(56) References Cited

OTHER PUBLICATIONS

English language abstract of JP-08-257876.
Machine English language translation of JP-2004-358624.
Machine English language translation of JP-2006-284531.
Machine English language translation of JP-08-257876.
Korean Office Action issued in 10-2010-0028260 on Sep. 26, 2011.
English Translation of Korean Office Action issued in 10-2010-0028260 on Sep. 26, 2011.
English Language Abstract of JP 2006-142412 published Jun. 8, 2006.
English Language Translation of JP 2006-142412 published Jun. 8, 2006.

* cited by examiner

CUTTING-EDGE POSITION DETECTING METHOD AND CUTTING-EDGE POSITION DETECTING APPARATUS

FIELD OF THE INVENTION

The present invention relates to a cutting-edge position detecting method and a cutting-edge position detecting apparatus in a machine tool. In particular, the present invention relates to a cutting-edge position detecting method and a cutting-edge position detecting apparatus for precisely positioning a cutting edge in a precision roll lathe.

BACKGROUND ART

Roll grinders and roll lathes are known as machine tools for machining a roll.

The roll lathe is a turning machine in which a cutter rest equipped with a diamond tool is disposed on a carriage. A general use of the roll lathe is to machine a circumferential groove in a roll by rotating the roll on a headstock while moving the carriage in a fore and aft direction (X axis). When a groove is machined in an axial direction, the carriage is moved at a high speed in a right and left direction (Z axis), while dividing (indexing) the roll on the headstock (C axis). In this manner, a groove can be formed in the axial direction.

In recent years, due to an advanced machine control technique, there has been performed a super high-precision machining process for machining a rugged pattern or the like on an outer circumferential surface of a roll. For example, even a die for molding an optical lens can be recently machined by a lathe. The Applicant of the present application has proposed a vertical lathe for machining a die for molding a Fresnel lens (JP2004-358624A). This vertical lathe can precisely machine a V-shaped lens groove in a Fresnel-lens molding die.

With the prevailing use of a liquid crystal display, there is an increasing demand for a lens sheet in use for a back light of a liquid crystal panel. A lenticular lens sheet, a cross-lenticular lens sheet, a prism sheet, as well as a Fresnel lens sheet are used as such a lens sheet.

It has been under review in these days that a lenticular lens sheet, a cross-lenticular lens sheet, and a prism sheet are formed by extrusion molding with the use of a transfer roll.

A transfer roll for a lenticular lens sheet is formed by precisely machining circumferential grooves at predetermined intervals in the outer circumferential surface of a roll. Thus, the machining process can be performed by a roll lathe.

On the other hand, in a transfer roll for a cross-lenticular lens sheet or a transfer roll for a prism sheet, it is necessary to machine a triangular-pyramid pattern or a quadrangular-pyramid pattern in the outer circumferential surface of a roll.

A conventional precise machining process by using the aforementioned precision roll lathe is as follows. At first, a rotational center position of a tool rest is determined by means of a specialized jig. Then, an image of a cutting edge is taken by a microscope (optical system) connected to an apparatus, and the image is displayed on a monitor. Thereafter, an operator manually aligns a cutting-edge position with an intersection of two hairlines, i.e., a vertical hairline and a horizontal hairline, displayed on the monitor. Then, based on coordinates from the rotational center position to the cutting-edge position, information about the cutting-edge position is obtained.

Because of an enlarged size of a die, tools should be replaced in the course of the machining process. At this time, the positioning process for each tool should be performed with a significantly strict precision.

Figure 13:
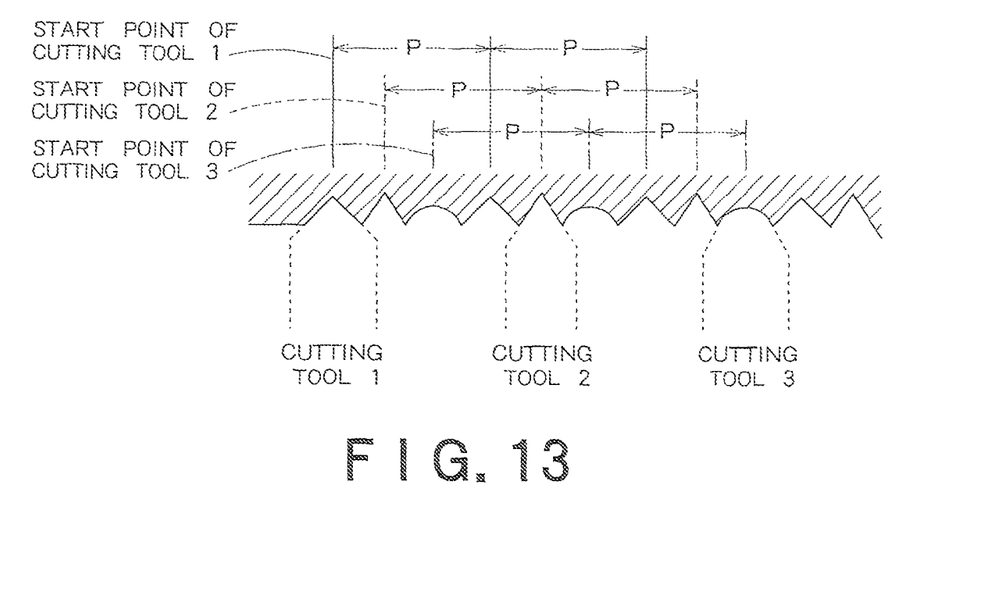
FIG. 13 is an illustrative view showing an example in which plural kinds of turning tools are used.

In addition, when a prism sheet or the like is formed, a machining process with the use of one kind of tool may be insufficient depending on an optical design. Namely, as shown in FIG. 13, a prism sheet requires a machining process with the use of plural kinds of tools. In this case, the importance of tool positioning process is further increased. As shown in FIG. 13, when three cutting tolls are used, machining intervals by the respective cutting tools must be extremely precise. Thus, the positioning process for each tool is very important.

In addition, some tool-shape measuring apparatuses, which are capable of being used for specifying a position of a cutting edge, are described in JP2006-284531A and JP8-257876A.

SUMMARY OF THE INVENTION

However, the operation for carefully aligning the cutting edge with the intersection of the two hairlines is somewhat laborsome, and it may take a longer time. Moreover, since the operation is performed manually, a positioning error inevitably occurs.

On the other hand, when a plurality of cutting tools are replaced with each other during the machining process, or when one cutting tool is used after each rotational positioning operation, information about the cutting edge of the cutting tool has to be set with a submicron precision.

However, for example, when an image of the cutting edge is taken by a ⅔ inch CCD camera with a lens magnification of twenty time, and the cutting edge is observed on a monitor of about 8.4 inches, a thickness of each hairline on the monitor may be approximately 2 to 3 μm although the thickness depends on the magnification. Thus, it is very difficult to obtain cutting-edge information with a required precision.

The object of the present invention is to provide a cutting-edge position detecting method and a cutting-edge position detecting apparatus capable of precisely detecting information about a cutting edge.

In order to achieve the above object, the cutting-edge position detecting method is a cutting-edge position detecting method comprising: determining a measurement reference point for measuring a position of a cutting edge of a tool; under a condition in which the cutting edge of the tool is positioned in an image that is taken by a camera, performing first sampling scanning operations for the image in a predetermined scanning direction at predetermined first intervals, and recognizing points on an upper edge line of the cutting edge of the tool and points on a lower edge line thereof, based on brightness changing points upon the first scanning operations; connecting the recognized points on the respective two edge lines, so as to obtain two first-level approximate linear lines by a least-squares method; performing second sampling scanning operations for the respective two first-level approximate linear lines in directions perpendicular thereto at predetermined second intervals, and newly recognizing points on the upper edge line of the cutting edge of the tool and points on the lower edge line thereof, based on brightness changing points upon the second scanning operations; connecting the newly recognized points on the respective two edge lines, so as to obtain two second-level approximate linear lines by a least-squares method; and obtaining a coordinate of an intersection of the second-level approximate linear lines, as the position of the cutting edge of the tool, with respect to the measurement reference point.

Preferably, the first sampling scanning operations are performed in an advancing direction and in the reverse direction; upon the scanning operations in the advancing direction, the points on the upper edge line or the points on the lower edge line are recognized; and upon the scanning operations in the reverse direction, the points on the lower edge line or the points on the upper edge line are recognized.

Preferably, the second interval of the second sampling scanning operations is narrower than the first interval of the first sampling scanning operations.

Alternatively, the present invention is a cutting-edge position detecting method comprising: determining a measurement reference point for measuring a position of a cutting edge of a tool; under a condition in which the cutting edge of the tool is positioned in an image that is taken by a camera, performing first sampling scanning operations for the image in a predetermined scanning direction at predetermined first intervals, and recognizing points on an upper edge line of the cutting edge of the tool and points on a lower edge line thereof, based on brightness changing points upon the first scanning operations; connecting the recognized points on the respective two edge lines, so as to obtain two first-level approximate linear lines by a least-squares method; performing second sampling scanning operations for the respective two first-level approximate linear lines in directions perpendicular thereto at predetermined second intervals, and newly recognizing points on the upper edge line of the cutting edge of the tool and points on the lower edge line thereof, based on brightness changing points upon the second scanning operations; connecting the newly recognized points on the respective two edge lines, so as to obtain two second-level approximate linear lines by a least-squares method; and obtaining a cutting-edge attachment angular line that is a bisector of an angle defined by the second-level approximate linear lines; performing a third scanning operation on the cutting-edge attachment angular line, and a recognizing a point on the cutting edge of the tool, based on a brightness changing point upon the third scanning operation; and obtaining a coordinate of the recognized point, as the position of the cutting edge of the tool, with respect to the measurement reference point.

Alternatively, the present invention is a cutting-edge position detecting apparatus comprising: a cutter rest configured to fix a tool; a camera configured to take an image including a cutting edge of the tool; and an image processing unit configured to perform steps, the steps including: determining a measurement reference point for measuring a position of a cutting edge of a tool; under a condition in which the cutting edge of the tool is positioned in an image that is taken by a camera, performing first sampling scanning operations for the image in a predetermined scanning direction at predetermined first intervals, and recognizing points on an upper edge line of the cutting edge of the tool and points on a lower edge line thereof, based on brightness changing points upon the first scanning operations; connecting the recognized points on the respective two edge lines, so as to obtain two first-level approximate linear lines by a least-squares method; performing second sampling scanning operations for the respective two first-level approximate linear lines in directions perpendicular thereto at predetermined second intervals, and newly recognizing points on the upper edge line of the cutting edge of the tool and points on the lower edge line thereof, based on brightness changing points upon the second scanning operations; connecting the newly recognized points on the respective two edge lines, so as to obtain two second-level approximate linear lines by a least-squares method; and obtaining a coordinate of an intersection of the second-level approximate linear lines, as the position of the cutting edge of the tool, with respect to the measurement reference point.

Alternatively, the present invention is a cutting-edge position detecting apparatus comprising: a cutter rest configured to fix a tool; a camera configured to take an image including a cutting edge of the tool; and an image processing unit configured to perform steps, the steps including: determining a measurement reference point for measuring a position of a cutting edge of a tool; under a condition in which the cutting edge of the tool is positioned in an image that is taken by a camera, performing first sampling scanning operations for the image in a predetermined scanning direction at predetermined first intervals, and recognizing points on an upper edge line of the cutting edge of the tool and points on a lower edge line thereof, based on brightness changing points upon the first scanning operations; connecting the recognized points on the respective two edge lines, so as to obtain two first-level approximate linear lines by a least-squares method; performing second sampling scanning operations for the respective two first-level approximate linear lines in directions perpendicular thereto at predetermined second intervals, and newly recognizing points on the upper edge line of the cutting edge of the tool and points on the lower edge line thereof, based on brightness changing points upon the second scanning operations; connecting the newly recognized points on the respective two edge lines, so as to obtain two second-level approximate linear lines by a least-squares method; and obtaining a cutting-edge attachment angular line that is a bisector of an angle defined by the second-level approximate linear lines; performing a third scanning operation on the cutting-edge attachment angular line, and a recognizing a point on the cutting edge of the tool, based on a brightness changing point upon the third scanning operation; and obtaining a coordinate of the recognized point, as the position of the cutting edge of the tool, with respect to the measurement reference point.

According to the present invention, after the first-level approximate linear lines of the upper edge line and the lower edge line of the cutting edge of the tool have been obtained by a general scanning method for processing an image, the second-level approximate linear lines approaching to the upper edge line and the lower edge line of the cutting edge of the tool are newly obtained based on the first-level approximate linear lines. Thus, the upper edge line and the lower edge line of the cutting edge of the tool can be more precisely obtained. As a result, information about the position of the cutting edge of the tool can be more precisely obtained.

DETAILED DESCRIPTION OF THE INVENTION

An embodiment of the present invention will be described in detail herebelow.

Figure 1:
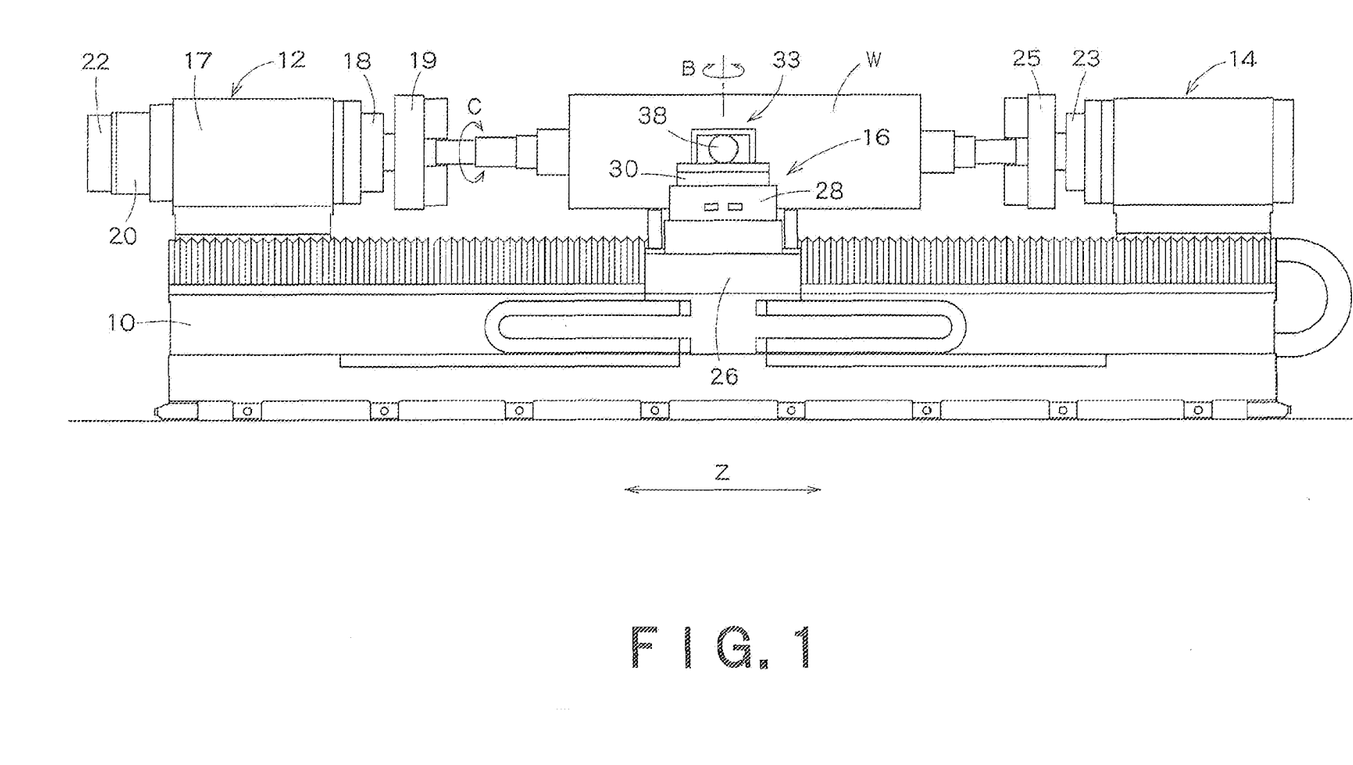
FIG. 1 is a side view schematically showing a precision roll lathe to which the present invention is applied.
Figure 2:
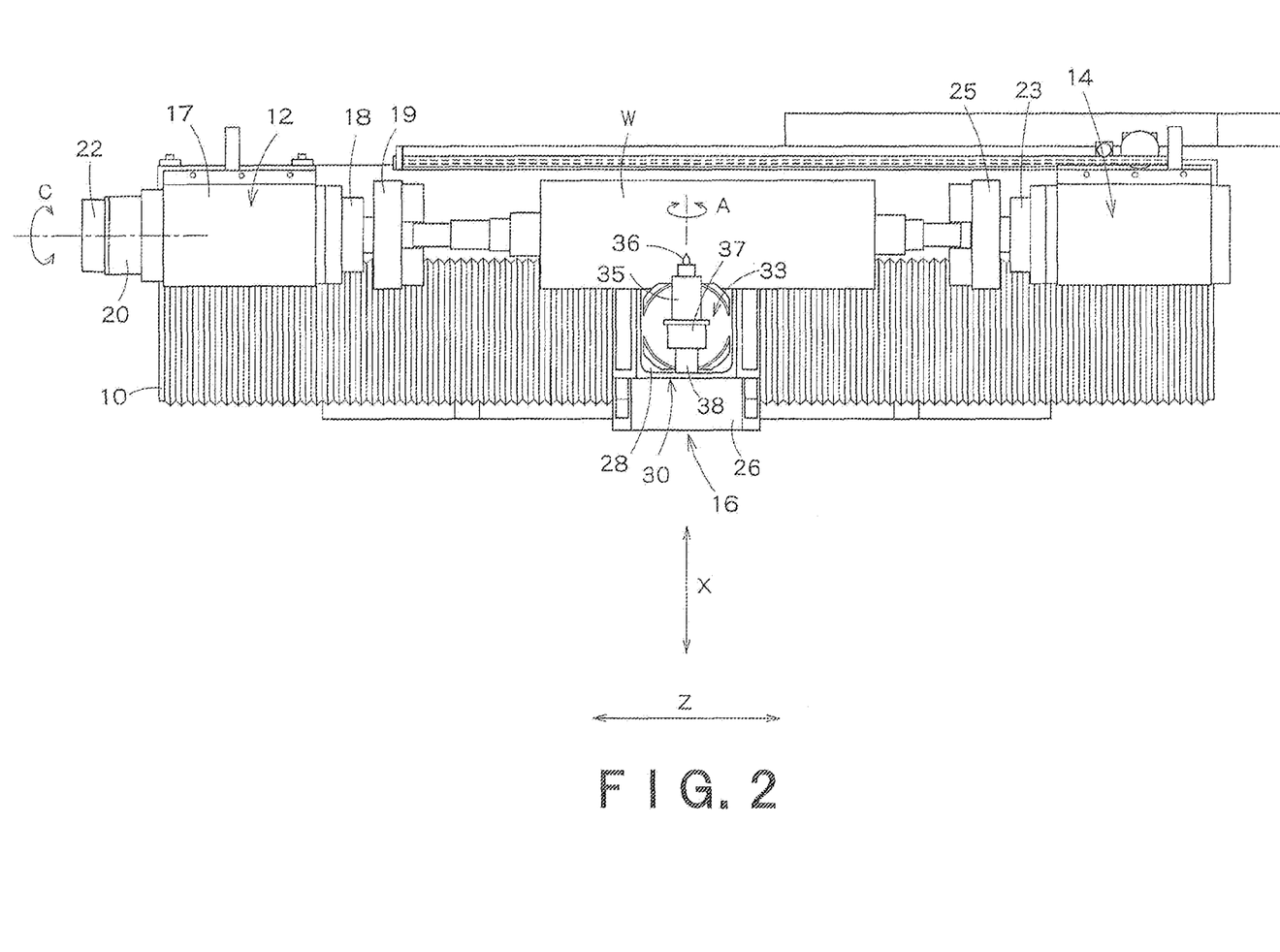
FIG. 2 is a plan view of the precision roll lathe of FIG. 1.

At first, a precision roll lathe, to which the present invention is applied, is described with reference to the attached drawings. FIG. 1 is a side view showing one example of a precision roll lathe to which the present invention is applied. FIG. 2 is a plan view thereof.

In FIGS. 1 and 2, the reference number 10 depicts a bed. Arranged on or above the bed 10 are a headstock 12, a tailstock 14, and a carriage 16. A workpiece is a roll W of a roll shape. The roll W is rotatably supported by the headstock 12 and the tailstock 14.

The headstock 12 is arranged on one longitudinal end of the bed 10. The headstock 12 includes a body part 17, a main shaft 18, a chuck 19 disposed on a tip of the main shaft 18, and a servomotor 20 configured to drive the main shaft 18. The main shaft 18 is supported by an oil static pressure bearing, not shown, which is incorporated in the body part 17. The chuck 19 grasps a shaft of the work W, and transmits a rotation of the main shaft 18 to the work. In the headstock 12, the servomotor 20 drives the main shaft 18 so as to rotate the work W at a high speed. In addition, the headstock 12 has a function as a dividing (indexing) axis (C axis) for circumferentially dividing (indexing) the work W, by detecting a rotational quantum of the servomotor 20 by an encoder 22 and by controlling the rotational quantum of the servomotor 20. Instead of the oil static pressure bearing, the bearing of the headstock 12 may be a pneumatic bearing or a bearing.

The tailstock 14 is arranged on the bed 10 such that the tailstock 14 is opposed to the headstock 12. A guide surface, not shown, is disposed on an upper surface of the bed 10, so that the tailstock 14 can be moved on the guide surface. In place of a general tailstock spindle, the tailstock 14 is provided with a main shaft 23. The shaft of the roll W is rotatably supported by a chuck 25 disposed on the main shaft 23. The basic structure of the tailstock 14 is similar to that of the headstock 12, excluding that the tailstock 14 does not include a servomotor.

Next, the carriage 16 is described.

The carriage 16 includes a saddle 26 disposed on the bed 10 so as to be movable in an axial direction of the roll W. Disposed on the saddle 26 is a table 28 which can be moved in a direction perpendicular to the axial direction of the roll W. In the precision roll lathe in this embodiment, an axis along which the saddle 26 is moved is a Z axis, and an axis along which the table 28 is moved on the saddle 26 is an X axis.

Figure 3:
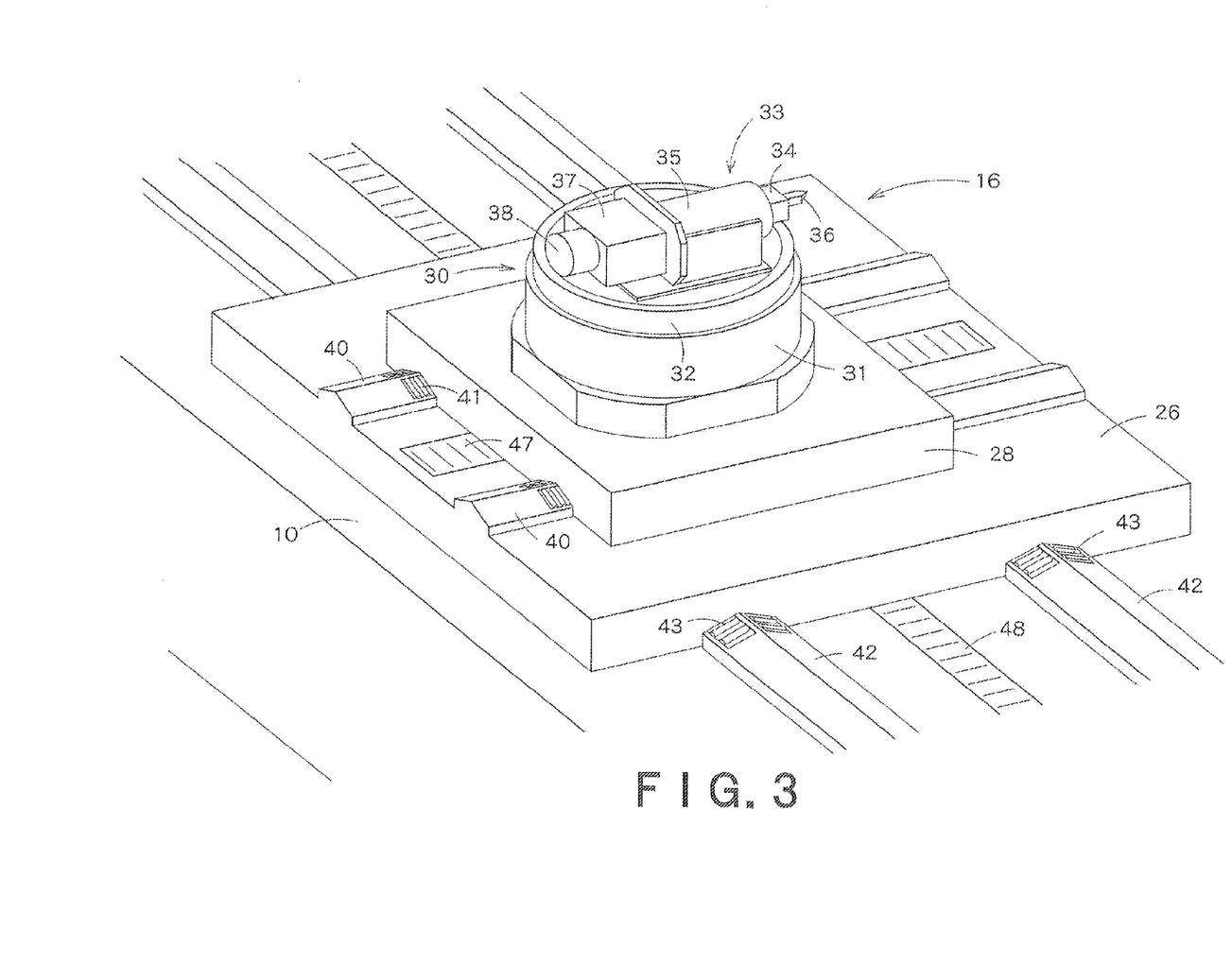
FIG. 3 is a perspective view of a tool swivel base disposed on the precision roll lathe of FIG. 1.
Figure 4:
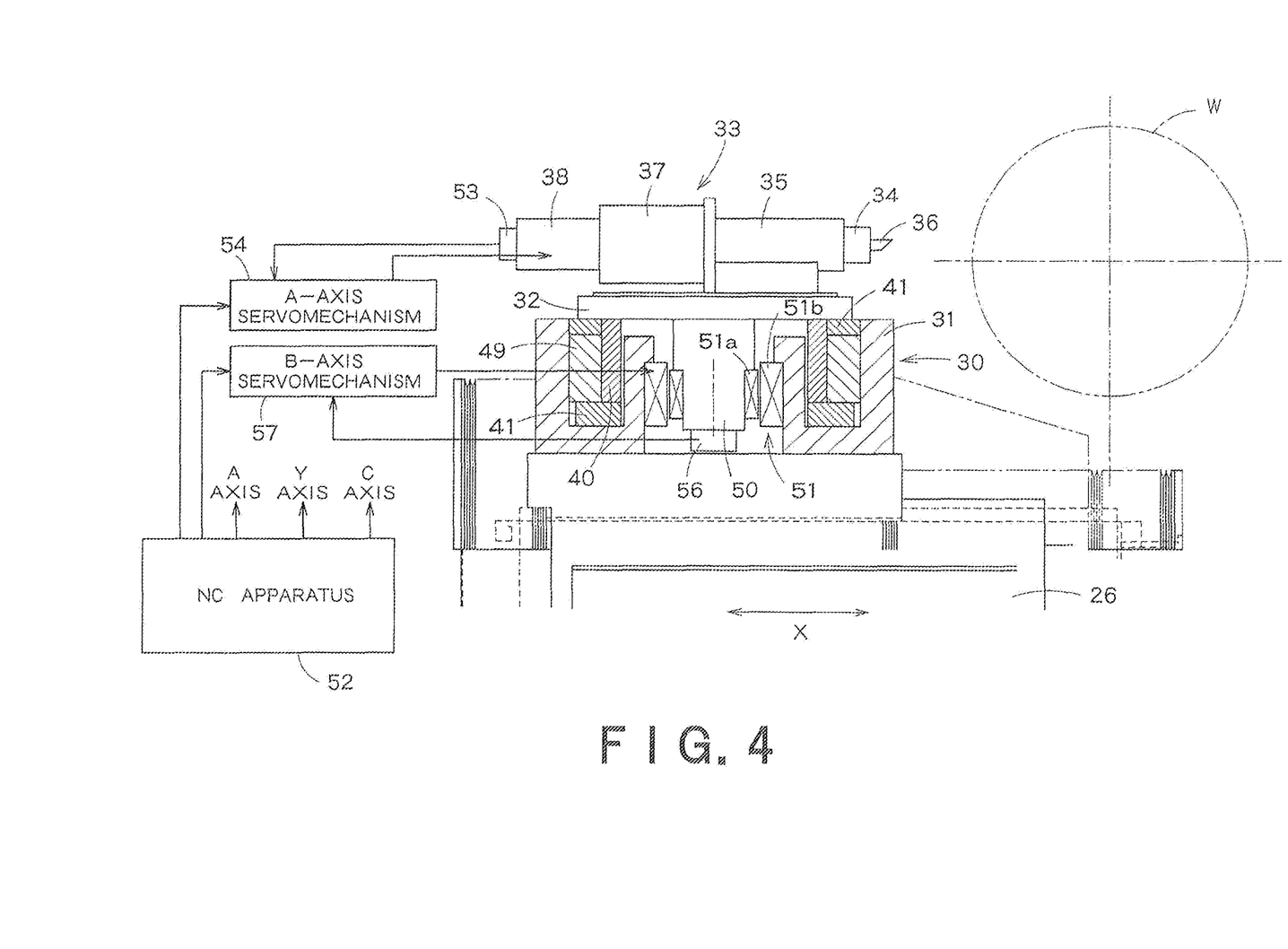
FIG. 4 is a partially sectional front view of the tool swivel base of FIG. 3.

FIG. 3 is a view showing a swivel base 30, with covers being removed from the bed 10 and the saddle 26. FIG. 4 is a sectional view of the swivel base 30. The swivel base 30 in this embodiment includes a swivel base body 31.

A cutter rest 33 is detachably attached to a top plate 32 of the swivel base 30. The cutter rest 33 is structured as a unit including a tool holder 34, a bearing 35, a speed reducer 37, and a servomotor 38. The cutter rest 33 can be attached to the top plate 32 and detached therefrom.

A diamond tool 36 is held by the tool holder 34. A shaft of the tool holder 34 is rotatably supported by the bearing 35. An output shaft of the speed reducer 37 is connected to the shaft of the tool holder 34, and the servomotor 38 is connected to an input shaft of the speed reducer 37. Thus, a rotation speed of the servomotor 38 is reduced by the speed reducer 37, and is transmitted to the tool holder 34. As described below, by controlling the servomotor 38, the diamond tool 36 is rotated about an A axis.

As shown in FIG. 4, a main shaft 40 is disposed inside the swivel base body 31. The main shaft 40 is rotatably supported by a thrust bush 41 and a radial bush 49. In this embodiment, gaps of about 15 μm are formed between the thrust bush 41 and a lower end surface of the main shaft 40, and between the radial bush 49 and the main shaft 40. The respective gaps constitute pneumatic static pressure bearings that support a thrust load and a radial load of the main shaft 40 by a high pressure air. The pneumatic static pressure bearing may be replaced with an oil static pressure bearing. The top plate 32 is connected to the main shaft 40.

A drive shaft 50 is coaxially mounted on the top plate 32. A rotor 51a of a servomotor 51 is fixed on the drive shaft 50. Herein, the servomotor 51 is a built-in type and is incorporated in the swivel base body 31 together with a stator 51b thereof. When the drive shaft 50 is driven in rotation by the servomotor 51, the cutter rest 33 and the top plate 32 are also rotated about a B axis. The B axis is an axis for dividing (indexing) the diamond tool 36 of the cutter rest 33.

As shown in FIG. 3, on the upper surface of the saddle 26, there is extended an X-axis guide rail 40 having a guide surface of an inverted V-shape. The X-axis guide rail 40 is provided with a finite-type rolling guide 41 on which a number of rollers held by retainers are arranged. Similarly, on the upper surface of the bed 10, there is extended a Z-axis guide rail 42 having a guide surface of an inverted V-shape. The Z-axis guide rail 42 is provided with a finite-type rolling guide 43.

A Z-axis feed driving apparatus that moves the saddle 26 and an X-axis feed driving apparatus that moves the table 28, on which the swivel base 30 has been mounted, are formed of linear motors in this embodiment. In FIG. 3, the reference number 47 depicts a permanent magnet row constituting a linear motor of an X-axis feed mechanism, and the reference number 48 depicts a permanent magnet row that extends in parallel with the Z-axis guide rail 42.

In FIG. 4, the reference number 52 depicts an NC apparatus. The NC apparatus 52 numerically controls the X axis, the Z axis, the A axis, the B axis, and the C axis. In a case of the A axis, a position control loop is set by an A-axis servomechanism 54 and an encoder 53 that detects an rotational angle of the diamond tool 36. The servomotor 38 is controlled based on a comparison between a command from the NC apparatus 52 and a position feedback from the encoder 53 such that a cutting face of the diamond tool 36 is inclined at a commanded angle. In a case of the B axis, a position control loop is set by a B-axis servomechanism 57 and an encoder 56, so that the B axis is structured such that the main axis 40 has a dividing (indexing) function.

Figure 5:
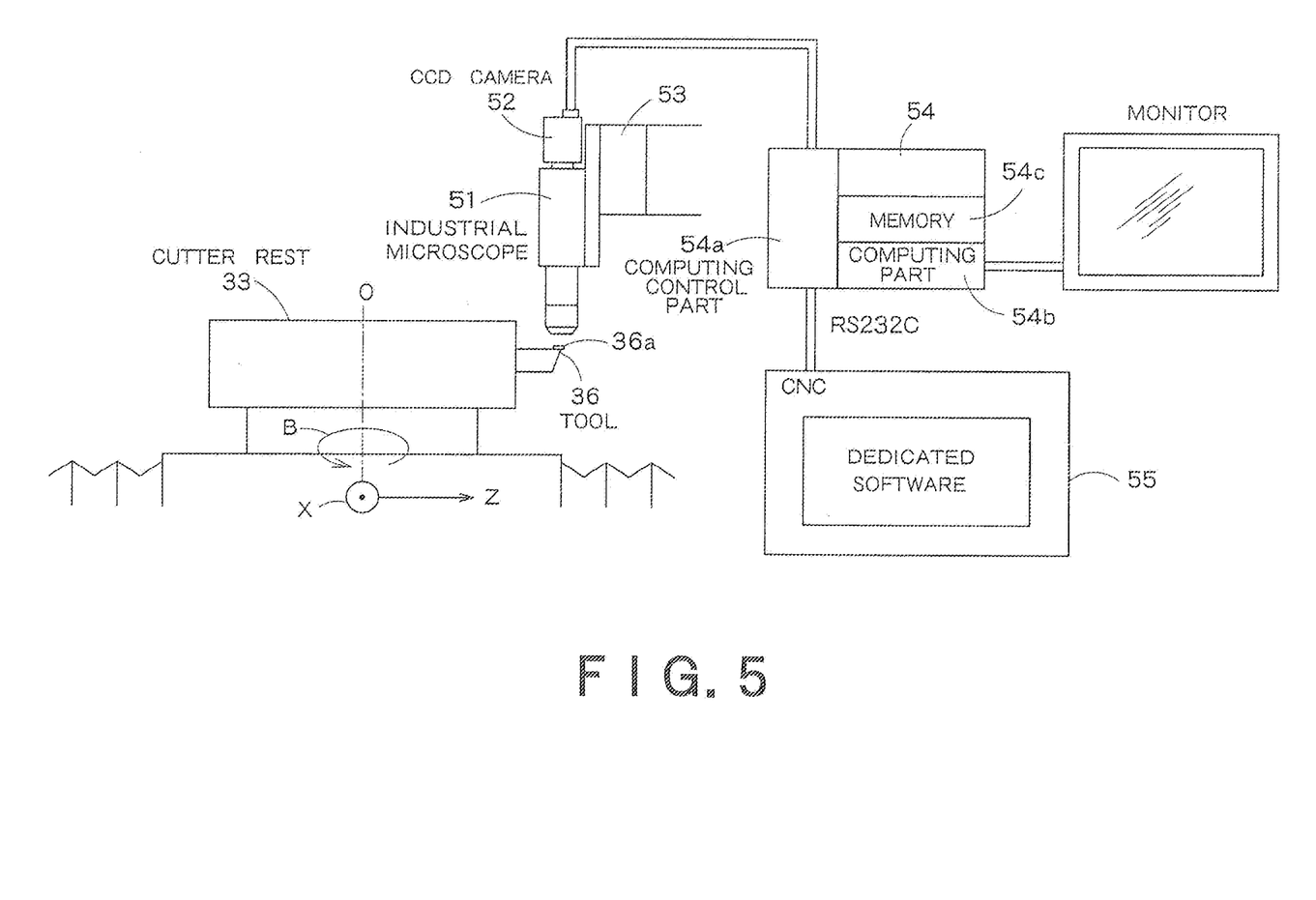
FIG. 5 is a schematic view showing main elements for performing an embodiment of a cutting-edge position detecting method according to the present invention.

FIG. 5 shows an example of a structure system according to the present invention based on the above roll lathe.

The example is configured to detect a position of a leading end 36a (cutting-edge) of the tool 36 as a cutting tool mounted on the rotatable cutter rest 33. An origin (measurement reference point) of the position measurement is a rotational center O of the cutter rest 33. When the origin is located at a reference point in an X direction, i.e., a fore and aft direction as well as is located at a reference point in a Z direction, i.e., a right and left direction, the position is referred to as a base (home) position. Described herein is a case in which the position in the X direction remains at the reference position, while only the position in the Z direction is changed. Namely, a parallel movement in the Z direction is described.

An image of the leading end 36a (cutting-edge) of the tool 36 is taken by an industrial optical microscope 51 and a CCD camera 52 connected thereto. The optical microscope 51 and the CCD camera 52 can be freely moved in the Z direction by a moving mechanism 53, whereby the image of the cutting-edge can be located at substantially a center of a display screen.

When a position of the cutting-edge of the tool 36 is measured, the moving mechanism 53 is controlled such that a measurement origin is calibrated with respect to the Z-axis reference position, i.e., to the rotational center of the cutter rest 33. Thereafter, the moving mechanism 53 is controlled such that the cutting edge is located at substantially the center of the image taken by the CCD camera.

At this time, image data obtained by the CCD camera are displayed on the screen by an image controller 54. Coordinates of respective points in the displayed image from the reference position can be also displayed by specifying the respective points on the screen according to need.

The image controller 54 is configured to perform a cutting-edge position measurement, and includes a memory 54c for storing the image data taken by the CCD camera and its coordinate data, a computing part 54b for performing various computing operations, and a computing control part 54a for controlling these elements.

Herebelow, a cutting-edge position detecting process is described in detail with reference to a flowchart of FIG. 6 and FIGS. 7 to 11 showing respective steps.

Figure 6:
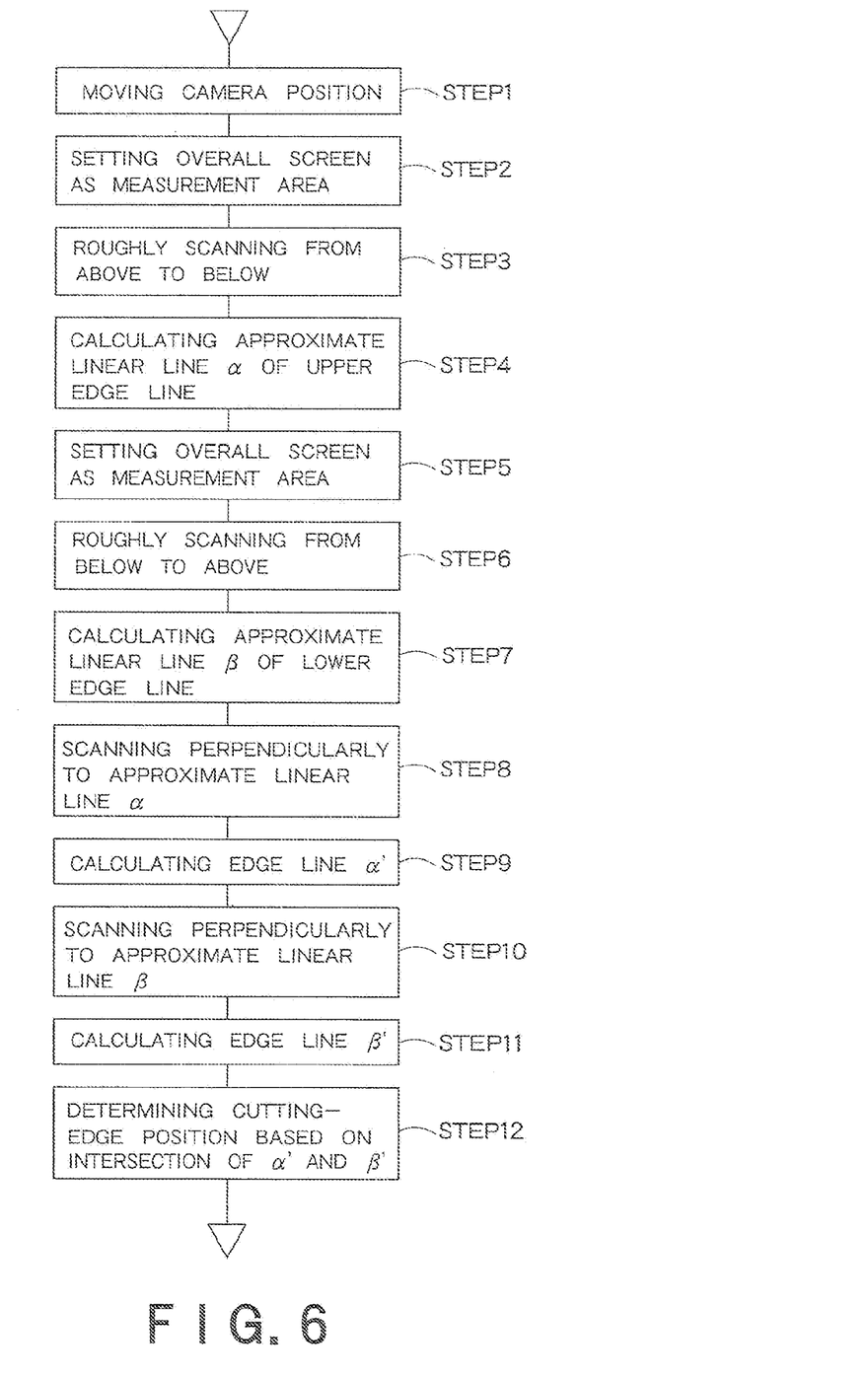
FIG. 6 is a flowchart explaining the embodiment of a cutting-edge position detecting method according to the present invention.

At first, magnification of image to be taken by the CCD camera is adjusted suitably for a desired measurement, and the rotational center of the cutter rest 33 is calibrated to the reference position. When an accurate calibration has been performed beforehand, this step can be omitted.

Figure 7:
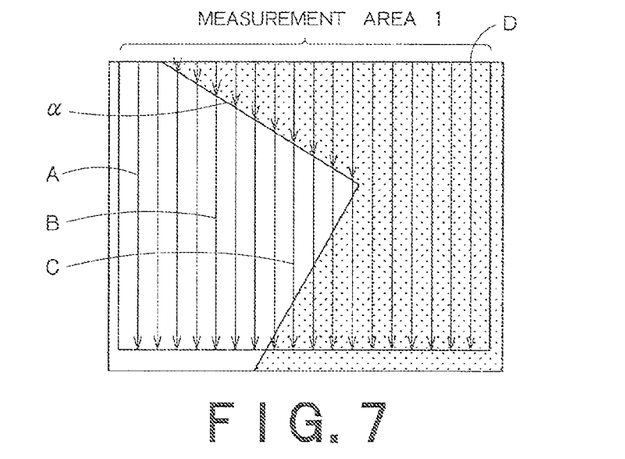
FIG. 7 is a view showing the STEP S3 of FIG. 6 on a display screen.

Then, the moving mechanism 53 is controlled to move a camera position, such that an image of the cutting edge is displayed at substantially a center of the display screen (STEP S1). This rough positioning can be performed manually. However, it is preferable that this rough positioning can be performed automatically with the aid of a known recognition technique. FIG. 7 shows the image at this time, in which two edge lines define a contour of the tool 36.

At this time, information about the cutting-edge position on the screen displayed by the image controller 54 is obtained by a dedicated software executed by a computer-control NC apparatus 55 (CNC). On the other hand, mechanical coordinates in the precision roll lathe at this time are obtained from the CNC 55, and are stored in the memory 54c of the image controller 54.

In order that the two edge lines of the cutting edge (leading end 36a of the tool 36) are exactly recognized, an image including a part of the upper edge line in the vicinity of the cutting edge is firstly set as a measurement area 1 (STEP S2). Then, the image of the measurement area 1 is scanned from above to below at predetermined horizontal sampling intervals, so that a position of the upper edge line (of an upper cutting blade of the tool 36) is detected on each scanning line based on a brightness difference on the screen (STEP S3). In this example, the tool is represented by the white color and the background is represented by the dotted pattern.

At this time, it is not necessary to scan all the pixels, and a rough scanning is sufficient. That is, the horizontal sampling interval can be relatively large. For example, a sampling scanning operation is performed for every ten pixels.

FIG. 7 shows these sampling scanning operations.

For example, as shown in FIG. 7, since a scanning line A lies entirely in the white area, the edge does not exist on the scanning line A. In a scanning line B, a point from which the dotted area changes to the white area is an upper edge position. In a scanning line C, since the dotted area changes to the white area and then to the dotted area again, a position from which the dotted area changes to the white area is an upper edge position. A scanning line D positioned in an area on the right side of the cutting edge lies entirely in the dotted area. Namely, since there is no white area, the edge does not exist on the scanning line D.

That is to say, the points from which the dotted area changes to the white area are points on the edge line of the upper cutting blade. Based on the detected edge position information, a first-level approximate linear line a connecting these edge positions is obtained in the form of a linear expression by a least-squares method (STEP S4). This line is an approximate linear line of the upper edge line (of the upper cutting blade).

Figure 8:
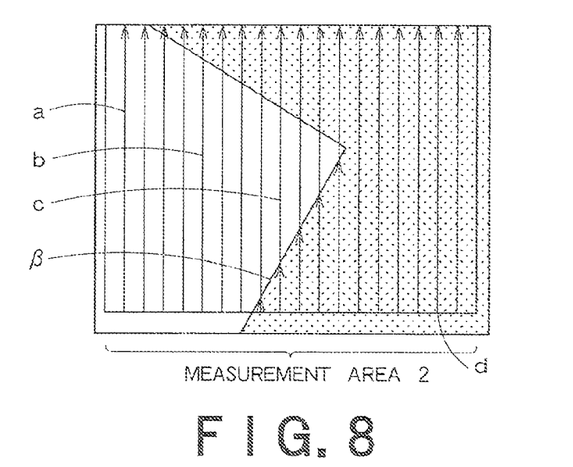
FIG. 8 is a view showing the STEP S6 of FIG. 6 on the display screen.

Then, an image including a part of the lower edge line in the vicinity of the cutting edge is set as a measurement area 2 (STEP S5). The image of the measurement area 2 is scanned from below to above by the predetermined horizontal sampling intervals, so that a position of the lower edge line (of a lower cutting blade of the tool 30) is detected on each scanning line based on a brightness difference on the screen (STEP S6). Also at this step, the scanning operations are performed in accordance with the required sampling intervals. Points from which the dotted area changes to the white area are points on the edge line of the lower cutting blade. For example, as shown in FIG. 8, since a scanning line a lies entirely in the white area, the edge does not exist on the scanning line a. In a scanning line b, although the white area changes to the dotted area, this is not the edge line of the lower cutting blade. In a scanning line c, since the dotted area changes to the white area and then to the dotted area again, a position from which the dotted area changes to the white area is a point on the edge line of the lower cutting blade. Since a scanning line d positioned in a'n area on the right side of the cutting edge lies entirely in the dotted area, the edge does not exist on the scanning line d.

That is to say, the points from which the dotted area changes to the white area are points on the edge line of the lower cutting blade. Based on the detected edge position information, a first-level approximate linear line β connecting these edge positions is obtained in the form of a linear expression by a least-squares method (STEP S7). This line is an approximate linear line of the lower edge line (of the lower cutting blade).

Although the approximate linear lines as obtained above express the edge lines almost precisely, the approximate expressions are not yet sufficiently exact. Thus, in order to improve the accuracy, the following steps are performed.

Figure 9:
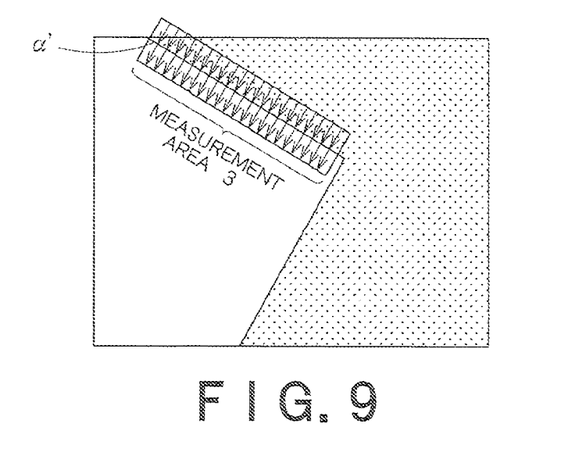
FIG. 9 is a view showing the STEP S8 of FIG. 6 on the display screen.

At first, as shown in FIG. 9, along the obtained approximate linear line a appearing on the screen, a part in the vicinity of the approximate linear line α is set as a measurement area 3, and the sampling scanning operations are performed perpendicularly to the approximate linear line α (STEP S8), so that a distance between the approximate linear line α and the actual edge line is measured on each scanning line. It is preferable that the scanning operations are performed at narrower sampling intervals. Then, the approximate linear line α is modified (a second-level approximate linear line α' is obtained) such that the distance between the approximate linear line α' and the actual edge line becomes minimum, i.e., the points on the approximate linear line α conform to the edge positions, by a least-squares method (STEP S9).

Figure 10:
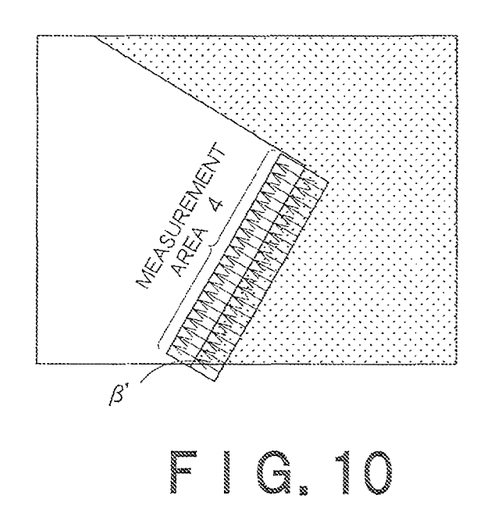
FIG. 10 is a view showing the STEP S10 of FIG. 6 on the display screen.

Then, similarly, as shown in FIG. 10, along the obtained approximate line β appearing on the screen, a part in the vicinity of the approximate linear line β is set as a measurement area 4, and the sampling scanning operations are performed perpendicularly to the approximate linear line β (STEP S10), so that a distance between the approximate linear line β and the actual edge line is measured on each scanning line. It is preferable that the scanning operations are performed at the narrower sampling intervals. Then, the approximate linear line β is modified (a second-level approximate linear line β' is obtained) such that the distance between the approximate linear line β' and the actual edge line becomes minimum, i.e., the points on the approximate linear line β conform to the edge positions, by a least-squares method (STEP S11).

These second-level approximate linear lines α' and β' exactly approach to the actual edge lines of the cutting edge.

Figure 11:
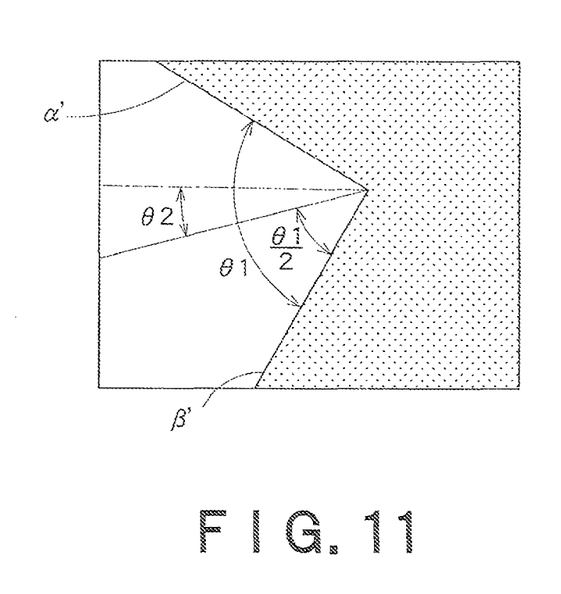
FIG. 11 is a view showing a subsequent step after the cutting-edge position detection on the display screen.

The cutting-edge position is calculated as an intersection coordinate (X', Y') of the second-level approximate linear lines α' and β' (STEP S12) (FIG. 11).

There is explained a concrete example of the cutting-edge position measurement as obtained above. For example, when an image of a cutting edge is taken by a two megapixel 1/1.8-inch CCD camera with a lens magnification of twenty times, an actual size of one pixel is about 0.2 μm. Due to the STEPs S1 to S12, the cutting-edge position can be detected with a detection precision not more than 0.2 μm.

Further, a cutting-blade angle θ1 can be obtained from an angle between the two second-level approximate linear lines α' and β'. Furthermore, a cutting-edge attachment angular line (in a direction of θ1/2) can be obtained, which is a bisector of the angle defined between the two second-level approximate linear lines. An angle defined by the cutting-edge attachment angular line with respect to a line in parallel with the Z axis is a cutting-edge attachment angle θ2.

These computing operations are performed in an absolute coordinate system in which the aforementioned reference point is used as a reference. However, since the angle of the approximate linear line can be easily calculated, the processes of the STEP S8 to the STEP S12 in which the approximate linear lines are perpendicularly scanned, can be performed in another relative coordinate system in which a point on the approximate linear line is used as a reference.

The finally obtained cutting-edge position information is stored in a memory (not shown) in the CNC, and is used for any future control.

The above-described computing processes can be performed in the exactly same manner even when tools are exchanged. Thus, even when tools are exchanged, the accurate cutting-edge position detection can be performed without any additional labor, while maintaining an excellent machining precision.

The cutting edge described in this embodiment defines an acute angle by two linear lines or two curved lines resembling two linear lines. However, as long as first-level approximate linear lines can be obtained in a first stage, the cutting edge itself may have a shape of an arcuate curve such as a part of a circular shape. In this case too, appropriate approximate linear lines can be obtained by suitably selecting sampling intervals for the scanning operations.

In addition, when it is known that the cutting edge is formed by a combination of a linear line and a curved line, the cutting-edge position can be precisely detected similarly to the above, by obtaining data about a shape of the tool from the NC apparatus, by dividing the shape into a linear line part and a curved line part, and by applying the above steps for each of the linear line part and the curved line part.

Alternatively, when the cutting edge has a round shape, the following steps are preferably performed, without setting the cutting edge position as an intersection coordinate (X', Y') of the second-level approximate linear lines α' and β'.

Figure 12:
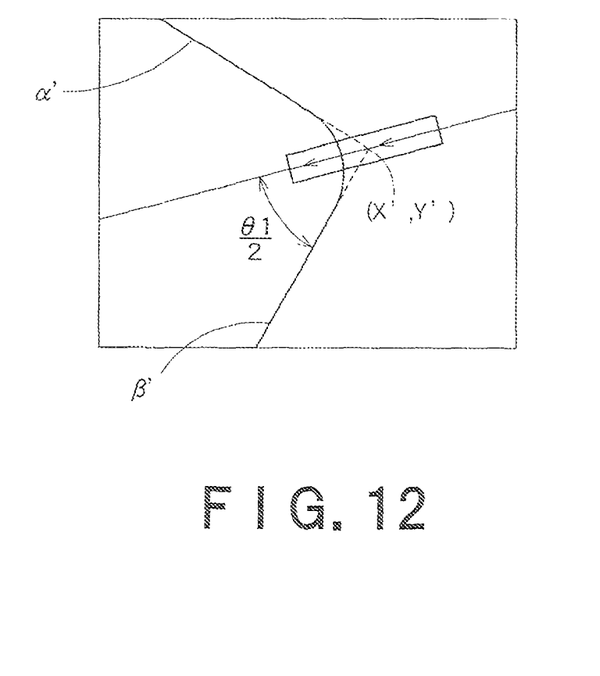
FIG. 12 is a view showing an additional step on the display screen.

Namely, a cutting-edge attachment angular line, which is a bisector of an angle defined between the second-level approximate linear lines α' and β', is obtained. Then, a third scanning operation is performed on the cutting-edge attachment angular line (see, FIG. 12: an area of a predetermine distance is scanned around the intersection coordinate (X', Y'), for example). A point on the cutting edge of the tool is recognized based on a brightness changing point upon the scanning operation, and the recognized point on the cutting edge of the tool is determined as a cutting edge position.

The invention claimed is:

1. A cutting-edge position detecting method comprising:
   determining a measurement reference point for measuring a position of a cutting edge of a tool;
   under a condition in which the cutting edge of the tool is positioned in an image that is taken by a camera, performing first sampling scanning operations for the image in a predetermined scanning direction at predetermined first intervals, and recognizing points on an upper edge line of the cutting edge of the tool and points on a lower edge line thereof, based on brightness changing points upon the first scanning operations;
   connecting the recognized points on the respective two edge lines, so as to obtain two first-level approximate linear lines by a least-squares method;
   performing second sampling scanning operations for the respective two first-level approximate linear lines in directions perpendicular thereto at predetermined second intervals, and newly recognizing points on the upper edge line of the cutting edge of the tool and points on the lower edge line thereof, based on brightness changing points upon the second scanning operations;
   connecting the newly recognized points on the respective two edge lines, so as to obtain two second-level approximate linear lines by a least-squares method; and
   obtaining a coordinate of an intersection of the second-level approximate linear lines, as the position of the cutting edge of the tool, with respect to the measurement reference point.

2. The cutting-edge position detecting method according to claim 1, wherein:
   the first sampling scanning operations are performed in an advancing direction and in the reverse direction;
   upon the scanning operations in the advancing direction, the points on the upper edge line or the points on the lower edge line are recognized; and
   upon the scanning operations in the reverse direction, the points on the lower edge line or the points on the upper edge line are recognized.

3. The cutting-edge position detecting method according to claim 1 or 2, wherein
   the second interval of the second sampling scanning operations is narrower than the first interval of the first sampling scanning operations.

4. A cutting-edge position detecting method comprising:
   determining a measurement reference point for measuring a position of a cutting edge of a tool;

under a condition in which the cutting edge of the tool is positioned in an image that is taken by a camera, performing first sampling scanning operations for the image in a predetermined scanning direction at predetermined first intervals, and recognizing points on an upper edge line of the cutting edge of the tool and points on a lower edge line thereof, based on brightness changing points upon the first scanning operations;

connecting the recognized points on the respective two edge so as to obtain two first-level approximate linear lines by a least-squares method;

performing second sampling scanning operations for the respective two first-level approximate linear lines in directions perpendicular thereto at predetermined second intervals, and newly recognizing points on the upper edge line of the cutting edge of the tool and points on the lower edge line thereof, based on brightness changing points upon the second scanning operations;

connecting the newly recognized points on the respective two edge lines, so as to obtain two second-level approximate linear lines by a least-squares method; and obtaining a cutting-edge attachment angular line that is a bisector of an angle defined by the second-level approximate linear lines;

performing a third scanning operation on the cutting-edge attachment angular line, and a recognizing a point on the cutting edge of the tool, based on a brightness changing point upon the third scanning operation; and obtaining a coordinate of the recognized point, as the position of the cutting edge of the tool, with respect to the measurement reference point.

5. A cutting-edge position detecting apparatus comprising:
a cutter rest configured to fix a tool;
a camera configured to take an image including a cutting edge of the tool; and
an image processing unit configured to perform steps, the steps including:

determining a measurement reference point for measuring a position of a cutting edge of a tool;

under a condition in which the cutting edge of the tool is positioned in an image that is taken by a camera, performing first sampling scanning operations for the image in a predetermined scanning direction at predetermined first intervals, and recognizing points on an upper edge line of the cutting edge of the tool and points on a lower edge line thereof, based on brightness changing points upon the first scanning operations;

connecting the recognized points on the respective two edge lines, so as to obtain two first-level approximate linear lines by a least-squares method;

performing second sampling scanning operations for the respective two first-level approximate linear lines in directions perpendicular thereto at predetermined second intervals, and newly recognizing points on the upper edge line of the cutting edge of the tool and points on the lower edge line thereof, based on brightness changing points upon the second scanning operations;

connecting the newly recognized points on the respective two edge lines, so as to obtain two second-level approximate linear lines by a least-squares method; and obtaining a coordinate of an intersection of the second-level approximate linear lines, as the position of the cutting edge of the tool, with respect to the measurement reference point.

6. A cutting-edge position detecting apparatus comprising:
a cutter rest configured to fix a tool;
a camera configured to take an image including a cutting edge of the tool; and
an image processing unit configured to perform steps, the steps including:

determining a measurement reference point for measuring a position of a cutting edge of a tool;

under a condition in which the cutting edge of the tool is positioned in an image that is taken by a camera, performing first sampling scanning operations for the image in a predetermined scanning direction at predetermined first intervals, and recognizing points on an upper edge line of the cutting edge of the tool and points on a lower edge line thereof, based on brightness changing points upon the first scanning operations;

connecting the recognized points on the respective two edge lines, so as to obtain two first-level approximate linear lines by a least-squares method;

performing second sampling scanning operations for the respective two first-level approximate linear lines in directions perpendicular thereto at predetermined second intervals, and newly recognizing points on the upper edge line of the cutting edge of the tool and points on the lower edge line thereof, based on brightness changing points upon the second scanning operations;

connecting the newly recognized points on the respective two edge lines, so as to obtain two second-level approximate linear lines by a least-squares method; and obtaining a cutting-edge attachment angular line that is a bisector of an angle defined by the second-level approximate linear lines;

performing a third scanning operation on the cutting-edge attachment angular line, and a recognizing a point on the cutting edge of the tool, based on a brightness changing point upon the third scanning operation; and obtaining a coordinate of the recognized point, as the position of the cutting edge of the tool, with respect to the measurement reference point.

\* \* \* \* \*